(12) United States Patent
Sallam (10) Patent No.: US 9,781,090 B2
(45) Date of Patent: Oct. 3, 2017

(54) ENTERPRISE COMPUTING ENVIRONMENT WITH CONTINUOUS USER AUTHENTICATION

(71) Applicant: Citrix Systems, Inc., Fort Lauderdale, FL (US)

(72) Inventor: Ahmed Said Sallam, Cupertino, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 91 days.

(21) Appl. No.: 14/708,707

(22) Filed: May 11, 2015

(65) Prior Publication Data

US 2016/0337328 A1    Nov. 17, 2016

(51) Int. Cl.
*H04L 29/06*    (2006.01)

(52) U.S. Cl.
CPC .......... *H04L 63/08* (2013.01); *H04L 63/0861* (2013.01)

(58) Field of Classification Search
CPC ............................ H04L 63/08; H04L 63/0861
USPC .......................................................... 726/7
See application file for complete search history.

(56) References Cited

U.S. PATENT DOCUMENTS

| | | | | |
|---|---|---|---|---|
| 2013/0267204 A1* | 10/2013 | Schultz | ................. | H04W 12/06 455/411 |
| 2014/0040628 A1* | 2/2014 | Fort | ........................ | G06F 21/34 713/182 |
| 2014/0316984 A1* | 10/2014 | Schwartz | ........... | G06Q 20/4016 705/44 |
| 2015/0356286 A1* | 12/2015 | Quirk | ...................... | G06F 21/32 726/19 |
| 2016/0239649 A1* | 8/2016 | Zhao | ..................... | G06F 21/316 |
| 2016/0306350 A1* | 10/2016 | Shim | .................... | G05D 1/0016 |

* cited by examiner

*Primary Examiner* — Kambiz Zand
*Assistant Examiner* — Tongoc Tran
(74) *Attorney, Agent, or Firm* — BainwoodHuang (57) ABSTRACT

Continuous user authentication includes receiving authentication event information including (1) transaction information describing authentication transactions, the transaction information received from authentication providers and including identification of users and instances of authentication of the users by the authentication providers, and (2) user identification and activity information describing presence and state (e.g. location) of the users, this information received from (a) mobile sensing devices in physical proximity of users independent of user location, and (b) stationary sensing devices at fixed locations of the users. The authentication event information is stored in an authentication event database and is provided to the authentication providers in a continual manner to enable the authentication providers to (a) establish new authentications of the users for accessing services of the computing system, and (b) maintain and revoke previously established authentications of the users based on the authentication event information and authentication policies.

18 Claims, 6 Drawing Sheets

ENTERPRISE COMPUTING ENVIRONMENT WITH CONTINUOUS USER AUTHENTICATION

BACKGROUND

In computing systems it is known to perform user authentication operations by which users are authenticated as a condition to obtaining access to system services. User authentication attempts to confirm user identity. A simple example is password-based authentication, which is based on a user's possession of a supposedly secret, user-specific password. More complex and powerful examples include so-called multi-factor authentication, which require that a user satisfy conditions along multiple dimensions. For example, a system may require a user to supply a conventional static password and also be able to supply a one-time password that is sent to a user device such as a smart phone. The second dimension or factor in this case is the user's possession of a user-specific smart phone that has been registered in advance. In large computing systems, a so-called "federation" or "single sign-on" approach may be used in which authentication is centralized in one or more specialized servers and a secure protocol enables the authentication servers to supply credentials to system services on behalf of authenticated users.

SUMMARY

One weakness of convention authentication schemes is what may be referred to as a "point in time" or discrete nature. A user is typically authenticated only once at the beginning of a session. This leaves a system vulnerable to certain kinds of attacks, such as those involving improper use or "hijacking" of an active session. Other attacks that can exploit vulnerabilities of conventional authentication schemes include spoofing and phishing attacks.

A disclosed technique addresses authentication vulnerabilities by various means. Generally, authentication is enforced in non-discrete or continuous manner, i.e., at multiple times throughout active sessions. Additionally, authentication is augmented with information that cannot easily be stolen or falsified, such as biometric information. The disclosed technique takes advantage of evolving technologies that can assist in identifying users uniquely.

One embodiment is directed to a computer-implemented method of continuous user authentication in a computing system is disclosed. The method includes receiving, by processing circuitry, authentication event information including (1) transaction information describing authentication transactions occurring in the computing system, where the transaction information is received from authentication providers and includes identification of users and respective instances of authentication of the users by the authentication providers. The authentication event information further includes (2) user identification and activity information describing presence and state of the users as they interact with the computing system. This information is received from (a) mobile sensing devices in physical proximity of respective users independent of user location, and (b) stationary sensing devices at fixed locations of the users when interacting with the computing system.

The method further includes storing, by the processing circuitry, the authentication event information in an authentication event database.

The method further includes providing, by the processing circuitry, authentication event information from the authentication event database to the authentication providers, the authentication event information being provided in a continual manner to enable the authentication providers to (a) establish new authentications of the users for accessing services of the computing system, and (b) maintain and revoke previously established authentications of the users based on the authentication event information and authentication policies of the computing system.

In some arrangements, the mobile sensing devices include personal devices carried or worn by respective users. At least some of the personal devices may be biometric sensing devices sensing biometric aspects of the respective users. The stationary sensing devices may include user presence sensing devices, such as cameras having facial recognition capability.

In some arrangements, the authentication providers include respective application agents closely coupled to respective applications executing in the computing system, the applications requiring user authentication as a condition to allowing user access to application services.

In some arrangements, the authentication providers include first and second authentication providers, the first authentication providers acting as both providers and consumers of the authentication event information, the second authentication providers acting as either but not both of providers and consumers of the authentication event information.

In some arrangements, the method further includes providing, by the processing circuitry, authentication event information from the authentication event database to third party consumers of the authentication event information, the third-party consumers not participating in sending authentication event information for storing in the authentication event database.

Another embodiment is directed to authentication server equipment that includes a communications interface, memory, storage, and one or more processors coupled to the communications interface, memory and storage, wherein the memory stores computer program instructions executed by the processors to form processing circuitry causing the authentication server equipment to perform a method of continuous user authentication in a computing system, the method including:

receiving, by the processing circuitry, authentication event information including (1) transaction information describing authentication transactions occurring in the computing system, the transaction information being received from authentication providers and including identification of users and respective instances of authentication of the users by the authentication providers, and (2) user identification and activity information describing presence and state of the users as they interact with the computing system, the user identification and activity information being received from (a) mobile sensing devices in physical proximity of respective users independent of user location, and (b) stationary sensing devices at fixed locations of the users when interacting with the computing system;

storing, by the processing circuitry, the authentication event information in an authentication event database; and providing, by the processing circuitry, authentication event information from the authentication event database to the authentication providers, the authentication event information being provided in a continual manner to enable the authentication providers to (a) establish new authentications of the users for accessing services of the computing system, and (b) maintain and revoke previously established authentications of the users based on the authentication event information and authentication policies of the computing system.

In some arrangements, the authentication server equipment may incorporate additional features or specifics as outlined above for the computer-implemented method.

Another embodiment is directed to a computer program product having a non-transitory computer-readable medium storing a set of computer program instructions, the computer program instructions being executable by processing circuitry of authentication server equipment to cause the authentication server equipment to perform continuous user authentication in a computing system, by:

receiving, by processing circuitry, authentication event information including (1) transaction information describing authentication transactions occurring in the computing system, the transaction information being received from authentication providers and including identification of users and respective instances of authentication of the users by the authentication providers, and (2) user identification and activity information describing presence and state of the users as they interact with the computing system, the user identification and activity information being received from (a) mobile sensing devices in physical proximity of respective users independent of user location, and (b) stationary sensing devices at fixed locations of the users when interacting with the computing system;

storing, by the processing circuitry, the authentication event information in an authentication event database; and providing, by the processing circuitry, authentication event information from the authentication event database to the authentication providers, the authentication event information being provided in a continual manner to enable the authentication providers to (a) establish new authentications of the users for accessing services of the computing system, and (b) maintain and revoke previously established authentications of the users based on the authentication event information and authentication policies of the computing system.

In some arrangements, the computer program instructions on the computer-readable medium may cause the computer equipment to incorporate additional or more specific functions and features as outlined above for the computer-implemented method.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

In brief summary, a continuous user authentication system attaches to applications/services such as enterprise, data sharing, and collaboration with further integration with devices such as the following:
    a—Office based Internet of Things (IoT) smart objects that detect user presence
    b—Wearable computers that can uniquely identify users
    c—Biometric sensors providing various forms of user authentication
    d—Smart cards
    e—Enterprise authentication servers The system constantly receives user identification information reliable enough to authenticate users. Authentication data is represented in a complex authentication structure that represents the type of authentication, along with additional provided information.

System services can sign into the system as a provider or consumer, or both, of authentication information. Any of the above types of entities can function as providers of authentication services.

The system updates subscribed consumer authentication services with user authentication status information along with additional relevant authentication information, such as that obtained from sensing devices as described more herein.

1—A distributed infrastructure of authentication agents that act as providers of authentication services. This would include:
  a. An authentication agent attaching to every Citrix product.
  b. The agent will capture users' authentication requests as they are carried through the Citrix products. That includes: devices, networks and cloud services.
  c. A dedicated device and gateway agent that can communicate with IoT smart object providing and detecting user presence capabilities.
  d. A dedicated device and gateway agent that can communicate with wearable computers that has the capability of uniquely identify users.
  e. A device agent that interacts with biometric sensors that provides various forms of user's authentication.
  f. An agent that interact with smart cards.

The system has characteristics such as the following:
1—It acts as a global aggregation point for all providers of user identification and authentication devices and services.
2—It retain a history of successful user identification and authentication instances.
3—It associates users' authentications with meta data that are relevant to the type of established identification.
4—It has secure authenticated API interfaces using cryptographic keys for authentication.
5—It integrates with enterprise, web and cloud directory services like active directory (AD), Azure AD, Amazon AWS, Google Cloud, etc.
6—It can observe and understand privacy requirements as required by compliance standards like HIPAA or as configured by system administrators.

When a user is authenticated at one end or side of the network, the system retains that information along with the identity of a reporting entity (wearable device, image recognition device, retina scanning device, two-factor authentication, etc.). The system then provides this information to subscribing consumers who can confirm whether they see an authentication violation.

The system understand the concept of users' location and accepts location information as meta information from identification providers. Examples include:
    GPS coordinates obtained from user personal devices, vehicles, etc.

Network triangulation (WiFi, LTE, BT, etc.).

IP address associated with machines in fixed locations.

GPS coordinates based on known fixed location of user presence sensors.

The system can establish a continuous view of the following:

Where users are

Which devices users are using

Which applications users are using whether running locally on devices or remotely via VDI Time stamps are associated with operations/transactions reported to the system. Example time stamps include time of access, time last seen, etc.

Information can be reported to the system synchronously or asynchronously. In case of synchronous reporting, the system can generate a time stamp on its own, otherwise it may rely on time stamps provided in reports. Time stamps help the system determine the order of events which can be relevant to authentication.

The continuous view allows the system to apply behavioral adaptive algorithms that can identify violations like the following:

Users using an application on a mobile device without being authenticated on the mobile device.

Users using an application on a desktop device without being authenticated on the desktop device.

Users identified as being participants to a meeting while not being authenticated in the meeting room.

The system can identify cases in which users continue using certain services even though their permitted time has expired. This determination would be made via having expiry-time associated with authentication info.

Figure 1:
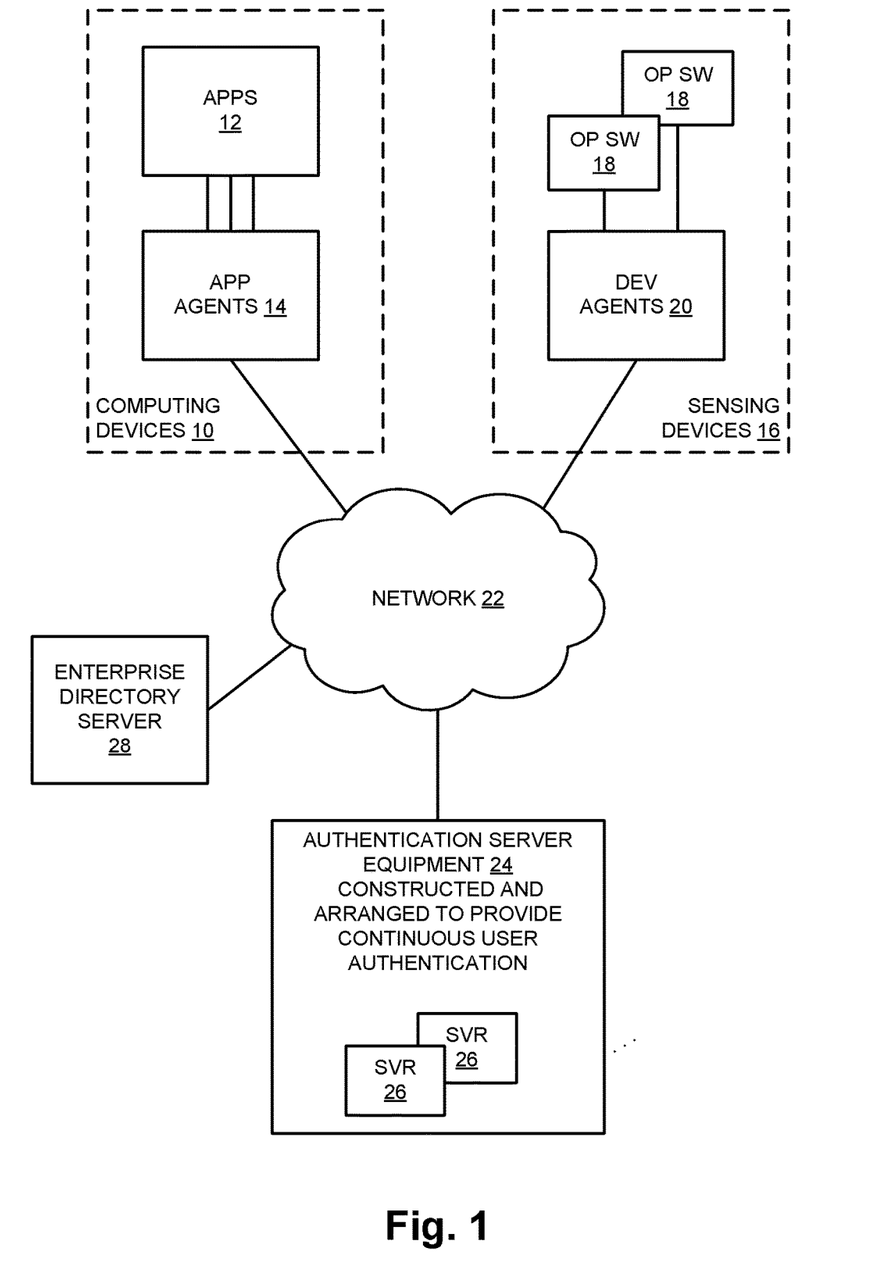
FIG. 1 is a block diagram of a computer system.

Turning now to the Figures, FIG. 1 shows a computing system that provides computing services to users including executing service applications, providing user connectivity to the service applications, etc. One aspect of the system relates to authentication of users as part of an overall security scheme that ensures that services are utilized by only authorized users. Authentication involves additional specialized applications and components as described further herein.

The system includes computing devices 10 of hardware types generally known in the art, i.e., personal computing devices such as PCs and smartphones, server computers, network devices, etc. As shown, the computing devices 10 execute applications (APPS) 12 and agents providing authentication-related functionality, shown as application agents (APP AGENTS) 14. The system also includes sensing devices 16 which have primary sensing functionality along with onboard computing and communication functionality enabling them to be integrated into a computing system. In this respect the sensing devices 16 may be referred to as "intelligent" or "smart" devices. The sensing devices 16 are shown as including respective instances of operating software (OP SW) 18, which may range from minimal low-level functionality (e.g., providing a register-based facility for external control and monitoring) to richer high-level functionality such as that of an embedded operating system combined with application(s), etc. The sensing devices 16 also include agents providing authentication-related functionality, shown as device agents (DEV AGENTS) 20.

The devices 10, 16 are connected via a network 22 to authentication server equipment 24 that is constructed and arranged to provide continuous user authentication as described herein. The authentication server equipment 24 generally includes one or more server computers (SVR) 26 as shown. The system may also include an enterprise directory server 28 that maintains and provides information about system users and user accounts, applications, etc. An example of an enterprise directory server 28 is a server computer running a program called "Active Directory" soled by Microsoft Corp.

The sensing devices 16 may be of various types such as outlined above. Regarding the "intelligence" aspect of the sensing devices 16, below are example technical characteristics:

1. Network connectivity with a local gateway via proprietary or standard protocols (e.g., Bluetooth, WiFi, Zigbee), or connected directly to a cloud server or via public Internet.
2. A device-specific sensing function.
3. A micro-controller and persistent memory to store and execute computational logic.
4. A programmable command and control application programming interface (API) to query recorded operational data and send commands specific to device functions.

In operation of the system, users interact with the applications 12 to obtain desired computing services, which may be of a broad variety of types. One specific example is online meeting services. An organization or enterprise deploys an online meeting server application as an application 12 on a server type of computing device 10, and user types of computing devices 10 execute respective instances of an online meeting client application that works together with the online meeting server application to provide online meetings to groups of users. An example of such an online meeting application is an application known as GoToMeeting® sold by Citrix Systems, Inc.

Operation of the applications 12 includes authenticating users who access the applications 12 for services, i.e., verifying that users seeking access to services are in fact the users who they are representing themselves to be. In part, authentication operations involve exchanges between the application agents 14 and the authentication server equipment 24. The authentication server equipment 24 maintains and provides, on a continual basis, information regarding user authentications and other activities, as well as information regarding user presence and location, which is used for improved user authentication in the system. This continual availability of information enables both initial and ongoing user authentication. Ongoing user authentication, referred to as "continuous" user authentication, is in contrast to conventional authentication schemes that may be called "point in time" authentication, wherein a user is authenticated only once at the beginning of a service session. With continuous user authentication, a user's authentication can be reevaluated, renewed, withdrawn, and otherwise changed at generally any point throughout a service session. The reevaluation and potential changing of authentication can be done in a planned manner, e.g. at regular small intervals, or in response to events. Continuous user authentication can increase security by making certain types of attacks more difficult. Authentication providers can selectively maintain and revoke previously established authentications of the users based on the authentication event information and authentication policies of the computing system.

The computing devices 10 generally function as both sources (providers) and recipients (consumers) of authentication information. Many applications 12 include at least rudimentary authentication functionality, e.g., password-based authentication. In more sophisticated arrangements there may be specialized authentication functions offloaded onto dedicated authentication servers among the computing devices 10, with functionality integrated into client applications by respective agents or instrumentation and communications protocols used between the authentication servers and the client applications. Examples of such arrangements can be found in so-called "federated" or "single sign-on" (SSO) environments in which a centralized authentication server performs all user authentications and vouches for user authenticity to the various services being accessed in the system.

User authentication operations are themselves sources of authentication information that can be used in other user authentications. For example, if user X has been authenticated as accessing a system from location A, that fact is pertinent to a contemporaneous attempt by someone purporting to be user X to be authenticated at a separate location B. In this scenario, the application 12 performing the location-A authentication notifies the authentication server equipment 24 of the location-A authentication, and the authentication server equipment 24 makes this information available to another application 12 involved in the attempted use from location B. That application may use the information to deny access based on assumed impossibility that the user is who he/she purports to be. In this case the location-A application is a provider of authentication transaction information, and the location-B application 12 is a consumer of the authentication transaction information.

Another aspect of operation at the system level is the gathering and dissemination of user identification and activity information from the sensing devices 16, which helps to provide the desired continuous authentication. The sensing devices 16 include devices such as wearable smart devices (e.g., smart watches), fixed-location sensing devices such as cameras, biometric sensors, etc. that provide information about user identity, activity and location. The sensing devices 16 are providers of such information, and the authentication components of the applications 12 are consumers that use the information to perform enhanced user authentication. As a simple example, if user X is attempting to access services from apparent location A, the actual location of user X can be corroborated by location information from a sensing device 16 having location awareness, e.g., having GPS functionality. An application 12 can obtain such sensed location information from the authentication server equipment 24, where it is centrally stored, and factor it in to the authentication process.

Figure 2:
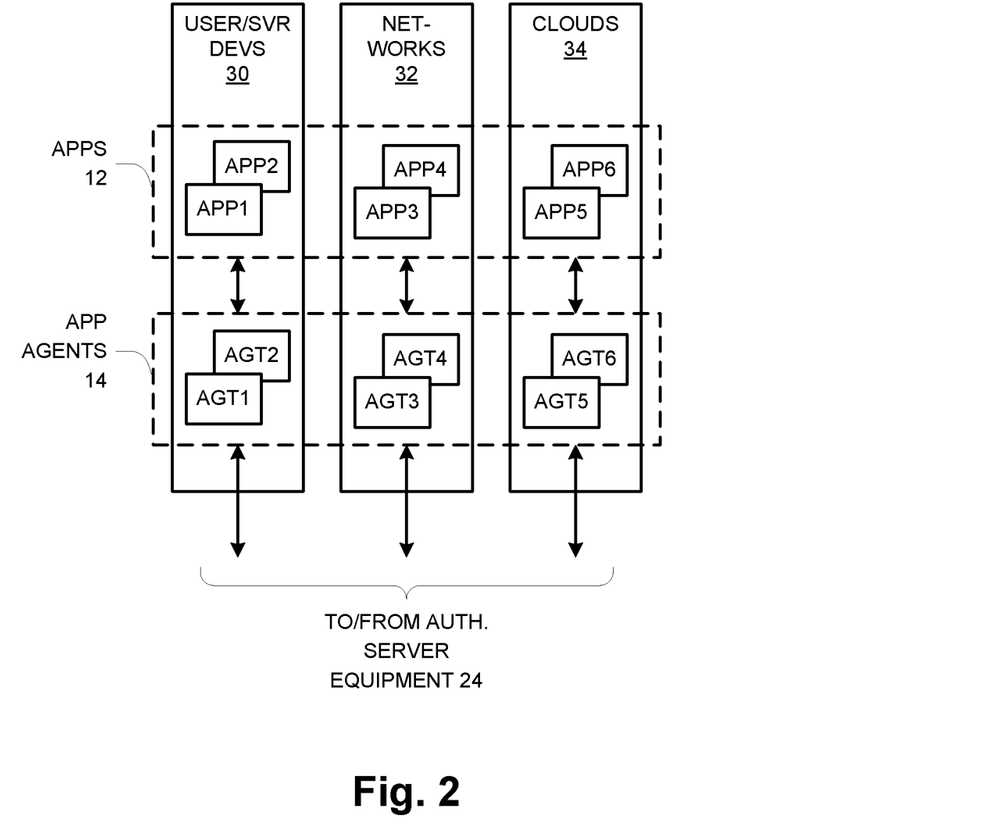
FIG. 2 is a schematic diagram of applications and agents distributed across computing devices.

FIG. 2 illustrates a slightly more detailed aspect of the applications 12 and application agents 14, namely that they are generally distributed among a variety of computing devices 10 of different types. In the illustrated example they are distributed among user and server devices (USER/SVR DEVS) 30, networks 32 and clouds 34. Examples of user and server devices 30 are given above. Applications 12 and application agents 14 can also be deployed in networks 32 (more specifically, on network devices such as gateways, proxies, firewalls, content routers, etc.) and in clouds 34, i.e., sets of computing resources made available from a remote location which may be managed/controlled by an entirely separate enterprise such as a cloud service provider.

The application agents 14 serve as authentication relay and communication agents that allow the applications 12, as authentication providers, to (a) communicate with each other to exchange authentication information, and (b) communicate with the central authentication server equipment 24.

Figure 3:
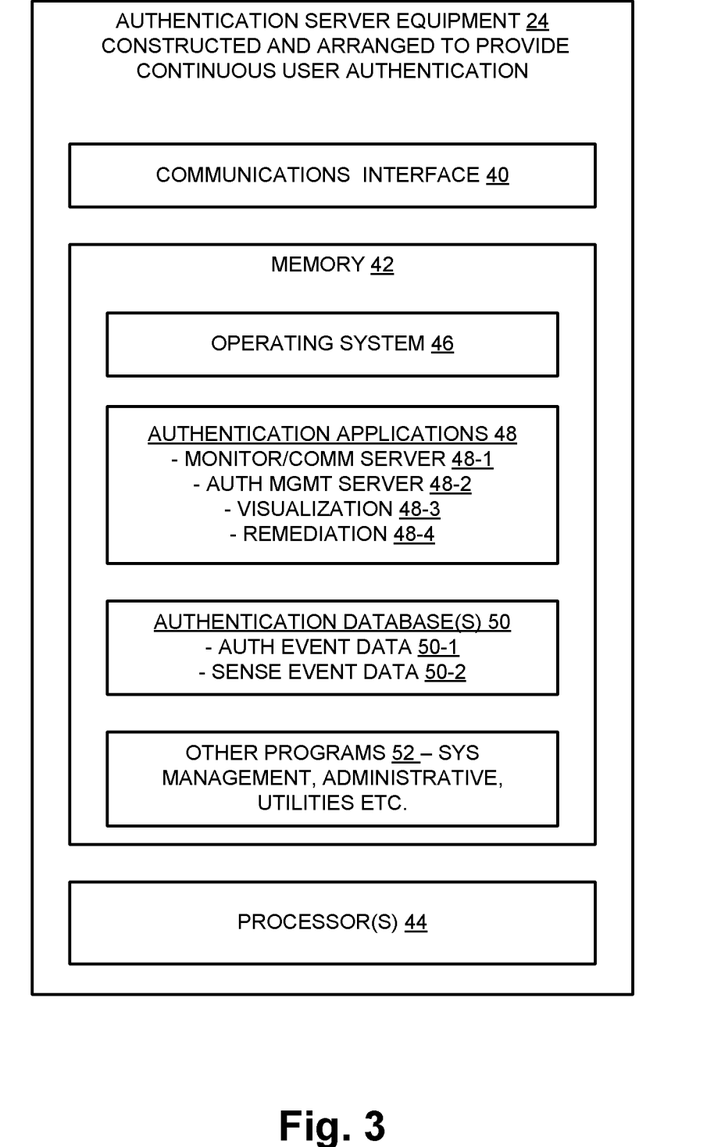
FIG. 3 is a block diagram of authentication server equipment.

FIG. 3 shows the authentication server equipment 24. It is typically realized by one or more computers, e.g., server computers 26 (FIG. 1), which may be located in a corporate data center, web farm, cloud computing facility(ies), or some mixture thereof. The equipment includes a communications interface 40, memory 42 and processor(s) 44. The memory 42 and processors 44 collectively form processing circuitry that executes application software and other computer program instructions to realize functionality as described herein. The communications interface 40 provides connections to the network 22 (FIG. 1) and perhaps other external systems or devices, such as locally attached secondary storage (not shown) for example.

As shown, the memory 42 stores software including an operating system 46 and authentication applications 48 that are executed by the processors 44. The authentication applications 48 include an authentication monitoring and communications (MONITOR/COMM) server 48-1 that provides core functionality as described more below. The authentication applications 48 also include an authentication management (AUTH MGMT) server 48-2, a visualization server 48-3, and a remediation server 48-4. The memory 42 also stores data that is used by the authentication applications 48, shown as authentication databases 50. Example data includes authentication event data 50-1 and sense event data 50-2, which are described more below. The memory 42 may also store other programs 52 such as system management or administrative applications, utilities, etc. A system management server can provide graphical and scripting user interfaces (UIs) to system administrators to configure system operations and query system events.

Briefly, the authentication monitoring and communication server 48-1 communicates with all authentication providers to receive their events, as well as providing responses to requests for authentication information in accordance with rules or policies that may be defined by the authentication management server 48-2. The authentication management server 48-2 provides visibility of authentication events to system administrators along with an ability to enforce certain decisions and control access to various resources. This may be done partly through use of explicit policies. The authentication visualization server 48-3 provides continuous and historical visualization of authentication events. The remediation server 48-4 is used to take appropriate action once a threat has been identified. A response may be rule-based and driven, or it may be policy-based and driven.

2—A Central Authentication Monitoring and Communication server: which communicates with all authentication providers to receive their events along with providing response as defined by the authentication management server.

3—An authentication relay and communication agent attaching to every authentication providers allowing each to:
a. Communicate with each other exchanging authentication information
b. Communicate with the central authentication server.

4—Enterprise authentication management servers: providing visibility to authentication events to system administrators along with ability to enforce certain decisions and control access to various resources.

Figure 4:
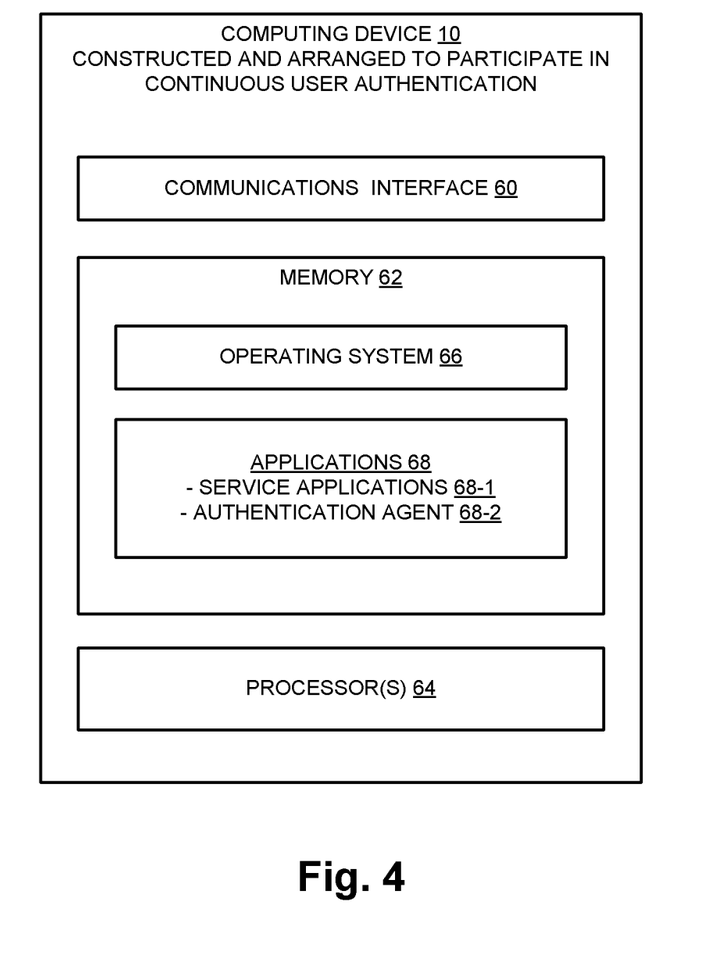
FIG. 4 is a block diagram of a computing device.

5—Enterprise authentication visualization server: providing continuous and historical visualization of authentication events 6—Enterprise authentication events database: storing history of authentication events 7—Enterprise authentication consumers: those could be any agent or 3rd party component that interact with the:

a. Authentication management server to query system aggregated and correlated logs and events.
b. Central authentication server that provides continuous access to authentication events.
8—Enterprise Remediation Server: once a threat has been identified, the server agent will drive the response which could be:
a. Rule based and driven
b. Admin policy driven FIG. 4 shows a computing device 10, which may be a server type of computer or a personal computing device as mentioned above. The computing device 10 includes a communications interface 60, memory 62 and processor(s) 64. The memory 62 and processors 64 collectively form processing circuitry that executes application software and other computer program instructions to realize functionality as described herein. The communications interface 60 provides connections to the network 22 (FIG. 1) and perhaps other external systems or devices.

As shown, the memory 62 stores software including an operating system 66 and applications 68 that are executed by the processors 64. The applications 68 include one or more service application 68-1 and authentication agents 68-2 that work with the authentication server 48-1 of the authentication server equipment 24 to provide authentication functionality as described herein. A service application 68-1 corresponds to an application 12, and an authentication agent 68-2 corresponds to an application agent 14.

Figure 5:
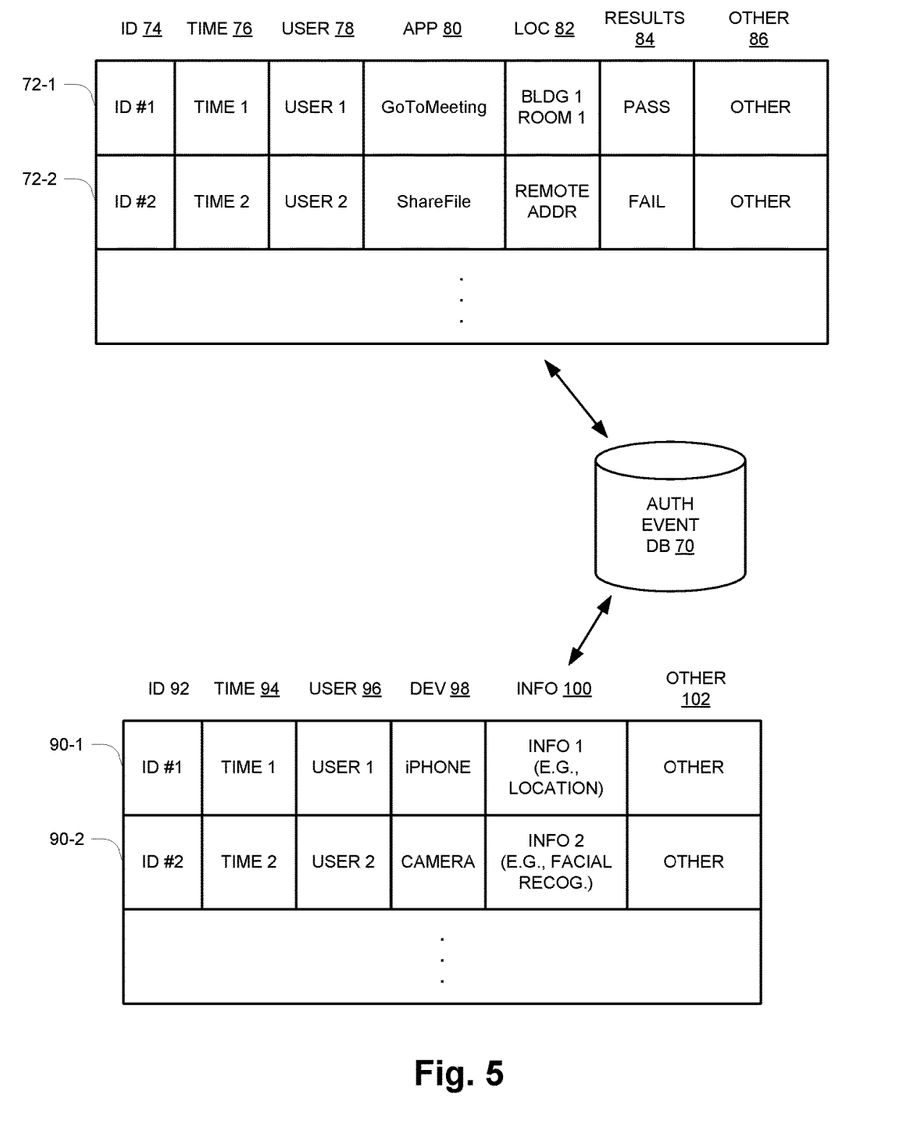
FIG. 5 is a schematic diagram of an authentication event database.

FIG. 5 illustrates contents of an authentication event database (AUTH EVENT DB) 70 that stores a variety of data, including authentication transaction information received from the computing devices 10 via the application agents 14 embedded therein, and user identification and activity information received from the sensing devices 16 via the device agents 20 embedded therein. The event database is 60 is one of the authentication databases 50 (FIG. 3) and is maintained by the authentication applications 48, specifically by the monitoring and communications server 48-1.

FIG. 5 shows first example records 72 (72-1, 72-2, etc.) and second example records 90 (92-1, 92-2, etc.) of the authentication event database 70. The records 72 store the authentication transaction information obtained from the computing devices 10, and the records 90 store the user identification and activity information from the sensing devices 16. All records reflect occurrences referred to as "events"—authentication transactions and instances of sensing that are reported to the online authentication server equipment 24.

As shown, the fields for the records 72 include an identifier (ID) field 74, time field 76, user field 78, application (APP) field 80, location field 82, results field 84, and other fields 86. The ID field 74 stores a unique identifier for a particular authentication transaction that has been reported. The time field 76 stores a time value identifying when the transaction occurred, and the user field 78 and application field 80 store a user identifier and an application identifier respective identifying the user and application involved in the transaction. The location field 82 stores a location of the user at the time of the transaction if known. The results field 84 identify whether the authentication was successful. Other relevant information may be stored in additional field(s) labelled Other 86.

The fields for the records 90 include an identifier (ID) field 92, time field 94, user field 96, device (DEV) field 98, information (INFO) field 100, and other fields 102. The ID field 92 stores a unique identifier for a particular sensing event that has been reported. For example, a device agent 20 in a location-sensing type of sensing device 16 might report location information at regular intervals, so each report results in a corresponding record 90 being created. The time field 94 stores a time value identifying when the sensing occurred, and the user field 96 stores a user identifier identifying the user for which the sensing occurred. The device field 98 identifies the type of sensing device 16 providing the report. The information (INFO) field 100 stores the sensed information that is being reported, e.g., location information, facial recognition information, etc. Other relevant information may be stored in additional field(s) labelled Other 86.

The authentication event database 70 is maintained by the authentication applications 48, and thus provides a write/update type of interface used by the authentication applications 48 for that purpose. The event database 70 also provides a query interface that enables the authentication applications 48 to retrieve event data for responding to requests or otherwise disseminating the authentication event data to consumers.

Figure 6:
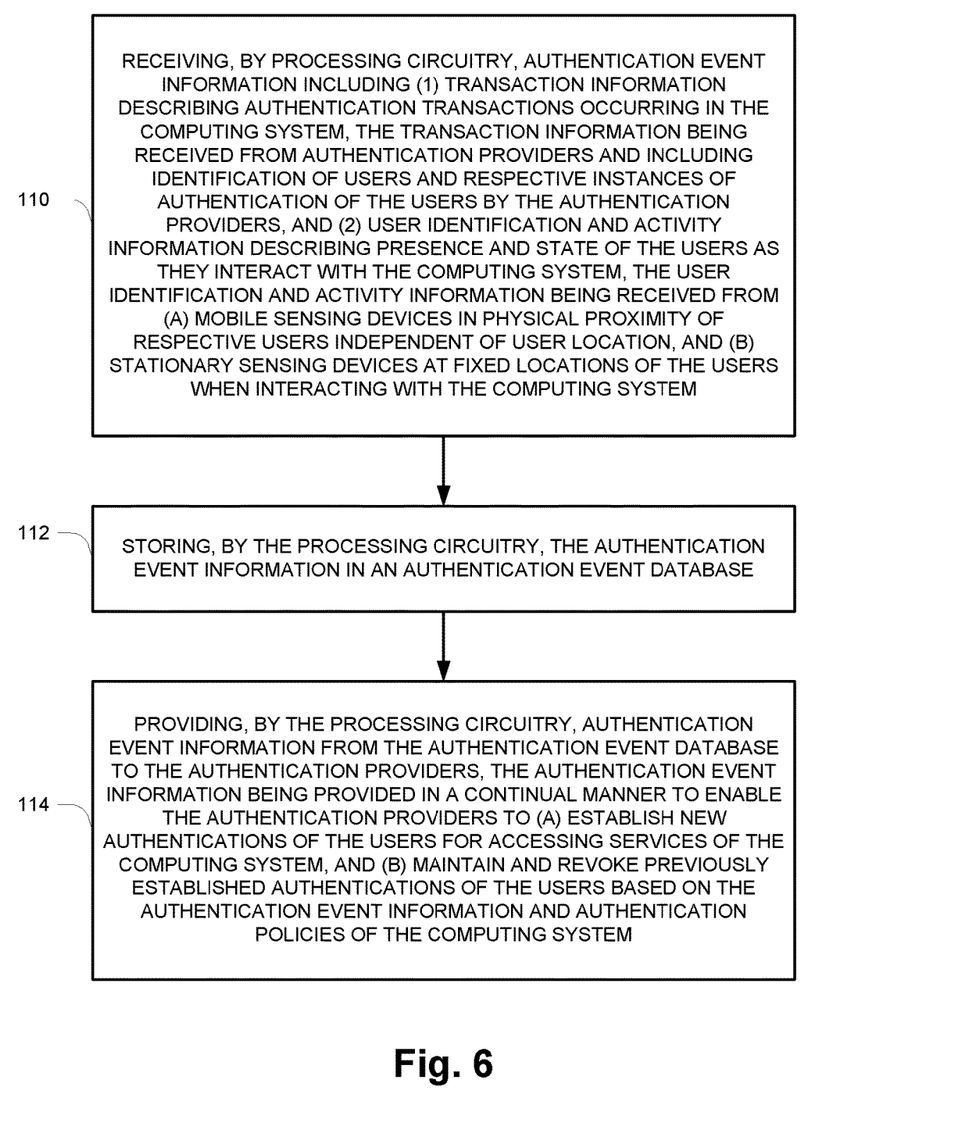
FIG. 6 is a flow diagram of operation of authentication server equipment.

FIG. 6 illustrates high-level operation of the authentication server equipment 24, specifically the processing circuitry (memory 42 and processors 44) executing the authentication applications 48.

At 110, the processing circuitry receives authentication event information including transaction information describing authentication transactions occurring in the computing system. The transaction information is received from authentication providers and includes identification of users and respective instances of authentication of the users by the authentication providers. Received authentication event information also includes user identification and activity information describing presence and state of the users (e.g., user location) as they interact with the computing system. The user identification and activity information is received from (a) mobile sensing devices in physical proximity of respective users independent of user location, and (b) stationary sensing devices at fixed locations of the users when interacting with the computing system. Examples of such devices are given above.

At 112, the processing circuitry stores the authentication event information in an authentication event database, e.g., the authentication event database 70 as described above.

At 114, the processing circuitry provides authentication event information from the authentication event database to the authentication providers. The authentication event information is provided in a continual manner to enable the authentication providers to (a) establish new authentications of the users for accessing services of the computing system, and (b) selectively maintain and revoke previously established authentications of the users based on the authentication event information and authentication policies of the computing system.

While various embodiments of the invention have been particularly shown and described, it will be understood by those skilled in the art that various changes in form and details may be made therein without departing from the spirit and scope of the invention as defined by the appended claims.

What is claimed is:
1. A computer-implemented method of continuous user authentication in a computing system, comprising:
receiving, by processing circuitry, authentication event information including (1) transaction information describing authentication transactions occurring in the computing system, the transaction information being received from authentication providers and including identification of users and respective instances of authentication of the users by the authentication providers, and (2) user identification and activity information describing presence and state of the users as they interact with the computing system, the user identification and activity information being received from (a) mobile sensing devices in physical proximity of respective users independent of user location, and (b) stationary sensing devices at fixed locations of the users when interacting with the computing system;

storing, by the processing circuitry, the authentication event information in an authentication event database; and providing, by the processing circuitry, authentication event information from the authentication event database to the authentication providers, the authentication event information being provided in a continual manner to enable the authentication providers to (a) establish new authentications of the users for accessing services of the computing system, and (b) maintain and revoke previously established authentications of the users based on the authentication event information and authentication policies of the computing system.

2. The computer-implemented method of claim 1, wherein the mobile sensing devices include personal devices carried or worn by respective users.

3. The computer-implemented method of claim 2, wherein at least some of the personal devices are biometric sensing devices sensing biometric aspects of the respective users.

4. The computer-implemented method of claim 1, wherein the stationary sensing devices include user presence sensing devices.

5. The computer-implemented method of claim 1, wherein the authentication providers include respective application agents closely coupled to respective applications executing in the computing system, the applications requiring user authentication as a condition to allowing user access to application services.

6. The computer-implemented method of claim 1, wherein the authentication providers include first and second authentication providers, the first authentication providers acting as both providers and consumers of the authentication event information, the second authentication providers acting as either but not both of providers and consumers of the authentication event information.

7. The computer-implemented method of claim 1, further including providing, by the processing circuitry, authentication event information from the authentication event database to third party consumers of the authentication event information, the third-party consumers not participating in sending authentication event information for storing in the authentication event database.

8. Authentication server equipment, comprising:
a communications interface;
memory;
storage; and
one or more processors coupled to the communications interface, memory and storage, wherein the memory stores computer program instructions executed by the processors to form processing circuitry causing the authentication server equipment to perform a method of continuous user authentication in a computing system, the method including:
receiving, by the processing circuitry, authentication event information including (1) transaction information describing authentication transactions occurring in the computing system, the transaction information being received from authentication providers and including identification of users and respective instances of authentication of the users by the authentication providers, and (2) user identification and activity information describing presence and state of the users as they interact with the computing system, the user identification and activity information being received from (a) mobile sensing devices in physical proximity of respective users independent of user location, and (b) stationary sensing devices at fixed locations of the users when interacting with the computing system;

storing, by the processing circuitry, the authentication event information in an authentication event database; and providing, by the processing circuitry, authentication event information from the authentication event database to the authentication providers, the authentication event information being provided in a continual manner to enable the authentication providers to (a) establish new authentications of the users for accessing services of the computing system, and (b) maintain and revoke previously established authentications of the users based on the authentication event information and authentication policies of the computing system.

9. The authentication server equipment of claim 8, wherein the mobile sensing devices include personal devices carried or worn by respective users.

10. The authentication server equipment of claim 9, wherein at least some of the personal devices are biometric sensing devices sensing biometric aspects of the respective users.

11. The authentication server equipment of claim 8, wherein the stationary sensing devices include user presence sensing devices.

12. The authentication server equipment of claim 8, wherein the authentication providers include respective application agents closely coupled to respective applications executing in the computing system, the applications requiring user authentication as a condition to allowing user access to application services.

13. The authentication server equipment of claim 8, wherein the authentication providers include first and second authentication providers, the first authentication providers acting as both providers and consumers of the authentication event information, the second authentication providers acting as either but not both of providers and consumers of the authentication event information.

14. The authentication server equipment of claim 8, wherein the method further includes providing, by the processing circuitry, authentication event information from the authentication event database to third party consumers of the authentication event information, the third-party consumers not participating in sending authentication event information for storing in the authentication event database.

15. A computer program product having a non-transitory computer-readable medium storing a set of computer program instructions, the computer program instructions being executable by processing circuitry of authentication server equipment to cause the authentication server equipment to perform continuous user authentication in a computing system, by:
receiving, by processing circuitry, authentication event information including (1) transaction information describing authentication transactions occurring in the computing system, the transaction information being received from authentication providers and including identification of users and respective instances of authentication of the users by the authentication providers, and (2) user identification and activity information describing presence and state of the users as they interact with the computing system, the user identification and activity information being received from (a) mobile sensing devices in physical proximity of respective users independent of user location, and (b) stationary sensing devices at fixed locations of the users when interacting with the computing system;

storing, by the processing circuitry, the authentication event information in an authentication event database; and providing, by the processing circuitry, authentication event information from the authentication event database to the authentication providers, the authentication event information being provided in a continual manner to enable the authentication providers to (a) establish new authentications of the users for accessing services of the computing system, and (b) maintain and revoke previously established authentications of the users based on the authentication event information and authentication policies of the computing system.

16. The authentication server equipment of claim 8, wherein the transaction information includes, for each of the authentication transactions from a respective authentication provider, (1) an identifier of the authentication transaction, (2) a user identifier and an application identifier respectively identifying a user and an application involved in the authentication transaction, and (3) a result indicator indicating whether the user was successfully authenticated by the authentication provider as part of the authentication transaction, and wherein the result indicator for a first authentication transaction by a first authentication provider and stored in the authentication event database is provided from the authentication event database to a second authentication provider in connection with a separate second authentication of the user.

17. The authentication server equipment of claim 8, being first authentication server equipment, and wherein the authentication providers include second authentication server equipment among a set of computing devices connected to the first authentication server equipment by a network, the second authentication server equipment executing specialized authentication functions and having associated functionality integrated into client applications by respective agents or instrumentation and using communications protocols to communicate with the client applications, and wherein receiving and providing authentication event information includes receiving and providing authentication event information from/to the second authentication server equipment.

18. The authentication server equipment of claim 17, wherein the set of computing devices implement a federated computing environment in which the second server equipment performs all user authentications and vouches for user authenticity to services being accessed in the system, using the authentication event information provided by the first server equipment.

* * * * *